United States Patent
Croteau et al.

(10) Patent No.: US 12,060,801 B1
(45) Date of Patent: Aug. 13, 2024

(54) GAS TURBINE VANE BODY WITH INSTRUMENTATION

(71) Applicant: Raytheon Technologies Corporation, Farmington, CT (US)

(72) Inventors: Paul F. Croteau, Columbia, CT (US); Thomas J. Martin, East Hampton, CT (US); Andrzej E. Kuczek, Bristol, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/115,027

(22) Filed: Feb. 28, 2023

(51) Int. Cl.
*F01D 21/00* (2006.01)
*F01D 9/04* (2006.01)

(52) U.S. Cl.
CPC .......... *F01D 21/003* (2013.01); *F01D 9/041* (2013.01); *F05D 2240/12* (2013.01)

(58) Field of Classification Search
CPC . F01D 21/003; F01D 9/00; F01D 9/02; F01D 9/04; F01D 9/041; F01D 9/042; F05D 2240/12; F05D 2240/121; F05D 2240/122
See application file for complete search history.

(56) References Cited

U.S. PATENT DOCUMENTS

| | | | |
|---|---|---|---|
| 3,348,414 A * | 10/1967 | Waters | G01K 13/02 374/115 |
| 3,592,061 A | 7/1971 | Schwedland | |
| 4,433,584 A | 2/1984 | Kokoszka | |
| 4,595,298 A | 6/1986 | Frederick | |
| 4,605,315 A * | 8/1986 | Kokoszka | F01D 21/003 374/138 |
| 9,970,316 B2 | 5/2018 | Radeljak | |
| 2014/0182292 A1* | 7/2014 | Hudon | F01D 21/003 60/722 |
| 2015/0110602 A1* | 4/2015 | Radeljak | F01D 17/085 29/889.22 |
| 2017/0138216 A1* | 5/2017 | Giordan | G01M 15/14 |
| 2019/0101019 A1* | 4/2019 | Haffner | F01D 21/12 |
| 2019/0277676 A1* | 9/2019 | Koenig | F02C 7/18 |
| 2020/0109661 A1* | 4/2020 | Raimarckers | G01L 7/082 |

FOREIGN PATENT DOCUMENTS

FR 3065527 B1 11/2020

* cited by examiner

*Primary Examiner* — Elton K Wong
(74) *Attorney, Agent, or Firm* — Getz Balich LLC

(57) ABSTRACT

An instrumented vane body is provided that includes a suction side and pressure side outer walls, an interior cavity, at least one supply conduit, a plurality of sensors, and a plurality of sensor ports. The suction and pressure side outer walls extend chordwise between leading and trailing edges and between inner and outer radial ends. The supply conduit is in fluid communication with the interior cavity, and is in communication with the interior cavity through at least one of the inner or outer radial ends. The sensor ports are disposed in the leading edge and each is configured to receive a sensor, and are spaced apart from one another. Each sensor port is in fluid communication with at least one vent aperture, and each is configured to permit core gas to enter that sensor part and exit the vane body through the at least one vent aperture.

20 Claims, 7 Drawing Sheets

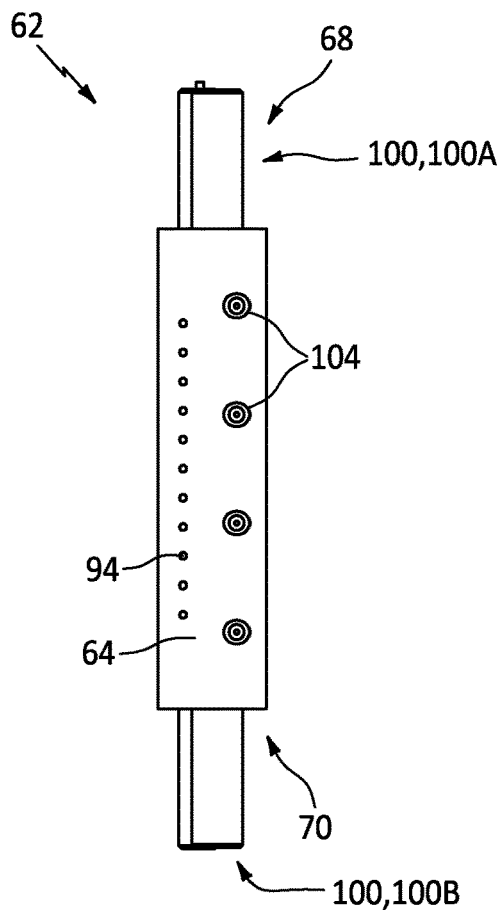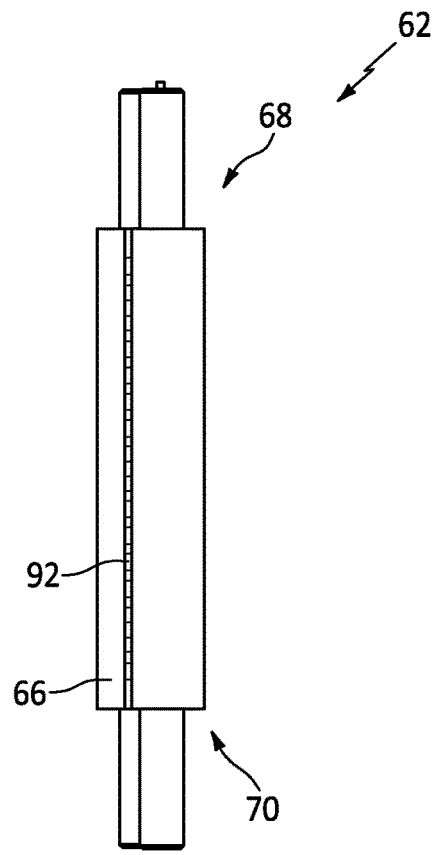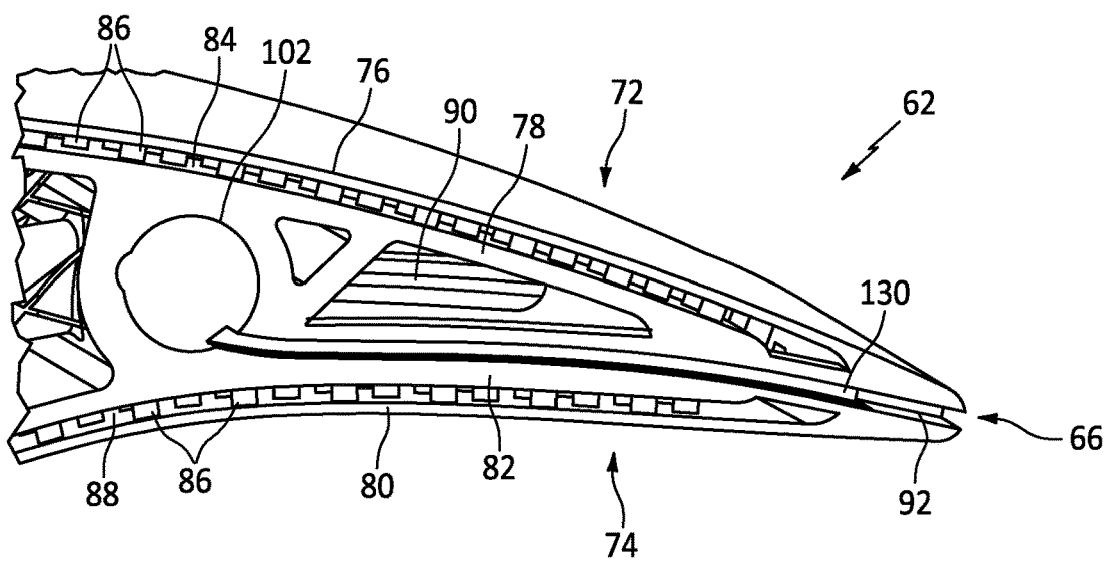

GAS TURBINE VANE BODY WITH INSTRUMENTATION

BACKGROUND OF THE INVENTION

1. Technical Field

The present disclosure relates gas turbine engines in general and to sensing instrumentation for use with gas turbine engines in particular.

2. Background Information

Measuring core gas parameters in a gas turbine engine or a gas turbine engine test rig can be challenging. The term "core gas" as used herein means gas that is ingested into the gas turbine engine and worked within the engine. The path that the core gas travels through the engine (i.e., the "core gas path") includes the passage through the compressor sections, the combustor, and the turbine sections. Depending on the axial position within the engine, the "core gas" may comprise only air (e.g., in the compressor sections) or it may include air and combustion products (e.g., in the turbine sections). The core gas environment requires core gas sensors be made of materials that can withstand very high temperatures. In some instances, core gas sensors are configured with a cooling capability to enhance their ability to withstand the high temperature environment. Core gas parameters including temperature, pressure, and gas species are sensed to evaluate the performance of the gas turbine engine.

It is known to use a "test rig" to sense core gas parameters within a gas turbine engine. A test rig may be a gas turbine engine that is specially configured with sensors and sensor probes to collect core gas parameter data. A Kiel probe is an example of a sensor probe that can be used to sense stagnation pressure and temperature of the core gas flow. A Kiel probe typically includes a temperature or pressure measuring device disposed within the open cavity of a shroud body or shielded body. The shroud body and measuring device may be disposed at the end of a stem structure that extends into the core gas path and dictates the radial position of the Kiel probe head within the core gas path. Some Kiel probe embodiments include a stem having a plurality of probe heads (i.e., probe heads in one or more rows), each disposed at a different radial position when installed. These type of probe embodiments permit sensing at different radial positions without the need to adjust or use different length probe stems.

Core gas parameter probes like a Kiel probe are not without issues. As stated above, the need to withstand high temperatures can limit the material used to construct such probes, and in some instances may require cooling. In addition to the temperature limitations, it is not always possible to position Kiel probes in optimum positions within the core gas path. Even if it is possible to position the probes in a desirable location, the probes are foreign to the core gas path (i.e., they would not normally be in the core gas path in a gas turbine engine) and create undesirable flow obstructions in the core gas path.

What is needed is a structure capable of collecting core gas parameters that can withstand the environmental temperatures, and one that does not create a flow obstruction within the core gas flow path.

SUMMARY

According to an aspect of the present disclosure, an instrumented vane body is provided that includes a suction side outer wall, a suction side inner wall, a pressure side outer wall, a pressure side inner wall, at least one supply conduit, a plurality of sensor ports, a plurality of sensors, an egress conduit, and a plurality of trailing edge vents. The suction side outer and inner walls extend chordwise between a leading edge and a trailing edge and between an inner radial end and an outer radial end. The suction side outer and inner walls are spaced apart from one another forming a suction side passage therebetween. The pressure side outer and inner walls both extend chordwise between the leading edge and the trailing edge and between then inner radial end and the outer radial end. The pressure side outer and inner walls are spaced apart from one another forming a pressure side passage therebetween. The suction and pressure side inner walls define an interior cavity. The at least one supply conduit is in fluid communication with the interior cavity through at least one of the inner radial end or the outer radial end. The suction side inner wall is configured to permit passage of cooling air from the interior cavity into the suction side passage, and the pressure side inner wall is configured to permit passage of cooling air from the interior cavity into the pressure side passage. The suction and pressure side passages are in fluid communication with an exterior of the vane body. The sensor ports are disposed in the leading edge, spaced apart from one another between the inner radial end and the outer radial end. Each sensor is disposed within a respective sensor port. The egress conduit extends within the interior cavity and out of the vane body at the inner or outer radial end, or both. The egress conduit is in fluid communication with the sensor ports. The trailing edge vents extend between the egress conduit and the exterior of the vane body proximate the trailing edge. The trailing edge vents are configured to provide fluid communication between the egress conduit and the exterior of the vane body.

In any of the aspects or embodiments described above and herein, each sensor port may have an open end disposed in the leading edge.

In any of the aspects or embodiments described above and herein, each sensor may have a forward end, and the forward end of the sensor is recessed within the respective sensor port.

In any of the aspects or embodiments described above and herein, a sensor may be a thermocouple.

In any of the aspects or embodiments described above and herein, the instrumented vane body may include a plurality of passages, where each respective passage extends between a respective sensor port and the egress conduit, providing fluid communication therebetween.

In any of the aspects or embodiments described above and herein, the instrumented vane body may include a plurality of first support members extending between the suction side outer and inner walls, and a plurality of second support members extending between the pressure side outer and inner walls.

In any of the aspects or embodiments described above and herein, wherein the suction side inner wall may include a plurality of suction side inner wall apertures extending through the suction side inner wall, and the pressure side inner wall may include a plurality of pressure side inner wall apertures extending through the pressure side inner wall.

In any of the aspects or embodiments described above and herein, the suction side outer wall may include a plurality of suction side outer wall apertures extending through the suction side outer wall, or the pressure side outer wall may include a plurality of pressure side outer wall apertures extending through the pressure side outer wall, or both.

In any of the aspects or embodiments described above and herein, the egress conduit may be sealed airtight to prevent core gas passage out of the egress conduit at the inner radial end, the outer radial end, or both.

According to an aspect of the present disclosure, an instrumented vane body is provided that includes a suction side outer wall, a pressure side outer wall, an interior cavity, at least one supply conduit, a plurality of sensors, and a plurality of sensor ports. The suction side and pressure side outer walls both extend chordwise between a leading edge and a trailing edge and between an inner radial end and an outer radial end. The at least one supply conduit is in fluid communication with the interior cavity. The at least one supply conduit is in communication with the interior cavity through at least one of the inner radial end or the outer radial end. The sensor ports are disposed in the leading edge. Each sensor port is configured to receive a sensor. The sensor ports are spaced apart from one another between the inner and outer radial ends. Each sensor port is in fluid communication with at least one vent aperture disposed proximate the trailing edge. Each sensor port is configured to permit core gas to enter that sensor part and exit the vane body through the at least one vent aperture.

In any of the aspects or embodiments described above and herein, each sensor port may have an open end disposed in the leading edge.

In any of the aspects or embodiments described above and herein, each sensor may be a thermocouple having a forward end. The forward end of each sensor is recessed within the respective sensor port a first distance.

In any of the aspects or embodiments described above and herein, each sensor port may be an aperture that extends into the vane body substantially perpendicular to the leading edge. Each sensor port has an open end disposed in the leading edge and an inner diameter surface. The instrumented vane body may further include a plurality spacing cylinders, each spacing cylinder disposed in a respective sensor port and each spacing cylinder having a length that extends between a forward end and an aft end, and a center bore that extends lengthwise between the forward end and the aft end and has a center bore inner diameter surface. A portion of each respective sensor may be disposed within the center bore of a respective spacing cylinder.

In any of the aspects or embodiments described above and herein, the forward end of each spacing cylinder may be recessed within the respective sensor port a second distance, wherein the second distance is greater than the first distance.

In any of the aspects or embodiments described above and herein, the center bore of each respective spacing cylinder and each respective sensor disposed within that center bore may be configured such that an annular region is disposed between the center bore inner diameter surface and the respective sensor to permit gas passage through the annular region.

In any of the aspects or embodiments described above and herein, the instrumented vane body may include an egress conduit and a plurality of passages. The egress conduit may extend within the interior cavity and out of the vane body at the inner or outer radial end. Each passage may extend between a respective sensor port and the egress conduit to provide fluid communication therebetween. The egress conduit may be in fluid communication with the at least one vent aperture disposed proximate the trailing edge.

In any of the aspects or embodiments described above and herein, the instrumented vane body may include a plurality of sensing port vent passages disposed around the periphery of each sensor port, wherein each vent passage breaks through the sensor port inner diameter surface and extends into the vane body beyond the spacing cylinder aft end.

In any of the aspects or embodiments described above and herein, the instrumented vane body may include a suction side inner wall extending chordwise between the leading edge and the trailing edge and between the inner radial end and the outer radial end, and spaced apart from the suction side outer wall to form a suction side passage therebetween, and a pressure side inner wall extending chordwise between the leading edge and the trailing edge and between the inner radial end and the outer radial end, and spaced apart from the pressure side outer wall to form a pressure side passage therebetween. The suction and pressure side passages may be in fluid communication with the interior cavity. The suction and pressure side passages may be in fluid communication with an exterior of the vane body.

In any of the aspects or embodiments described above and herein, the instrumented vane body may include a plurality of first support members extending between the suction side outer and inner walls, and a plurality of second support members extending between the pressure side outer and inner walls.

According to an aspect of the present disclosure, a stator vane assembly is provided that includes a plurality of stator vanes including at least one instrumented vane body. The instrumented vane body includes a suction side outer wall, a pressure side outer wall, an interior cavity, at least one supply conduit, a plurality of sensors, and a plurality of sensor ports. The suction side and pressure side outer walls extend chordwise between a leading edge and a trailing edge and between an inner radial end and an outer radial end. The at least one supply conduit is in fluid communication with the interior cavity through at least one of the inner radial end or the outer radial end. The sensor ports are disposed in the leading edge. Each respective sensor port is configured to receive a respective sensor, and the sensor ports are spaced apart from one another between the inner radial end and the outer radial end. Each sensor port is in fluid communication with at least one vent aperture disposed proximate the trailing edge. Each sensor port is configured to permit core gas to enter that sensor part and exit the vane body through the at least one vent aperture.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 7 is a planar leading edge view of the present disclosure instrumented vane body embodiment shown in FIG. 3.

FIG. 8 is a planar trailing edge view of the present disclosure instrumented vane body embodiment shown in FIG. 3.

FIG. 9 is a diagrammatic sectioned view of a present disclosure instrumented vane body embodiment.

DETAILED DESCRIPTION

The present disclosure is directed to an instrumentation body configured as a vane body that can be implemented in a gas turbine engine as a vane within a vane stator stage.

Figure 1:
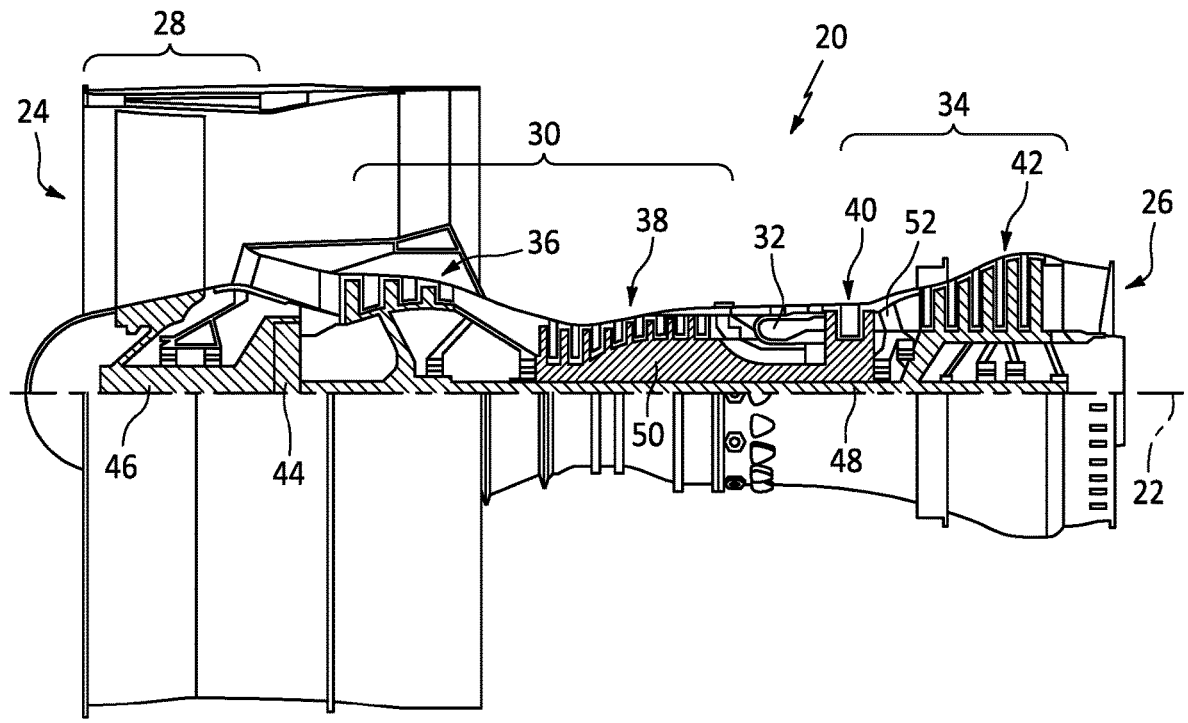
FIG. 1 is a diagrammatic sectional view of a gas turbine engine.

FIG. 1 shows a partially sectioned diagrammatic view of a geared gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The compressor section includes a low pressure compressor (LPC) 36 and a high pressure compressor (HPC) 38. The turbine section 34 includes a high pressure turbine (HPT) 40 and a low pressure turbine (LPT) 42. The engine sections are arranged sequentially along the centerline 22 within an engine housing. The fan section 28 is connected to a geared architecture 44, for example, through a fan shaft 46. The geared architecture 44 and the LPC 36 are connected to and driven by the LPT 42 through a low speed shaft 48. The HPC 38 is connected to and driven by the HPT 40 through a high speed shaft 50.

Figure 2:
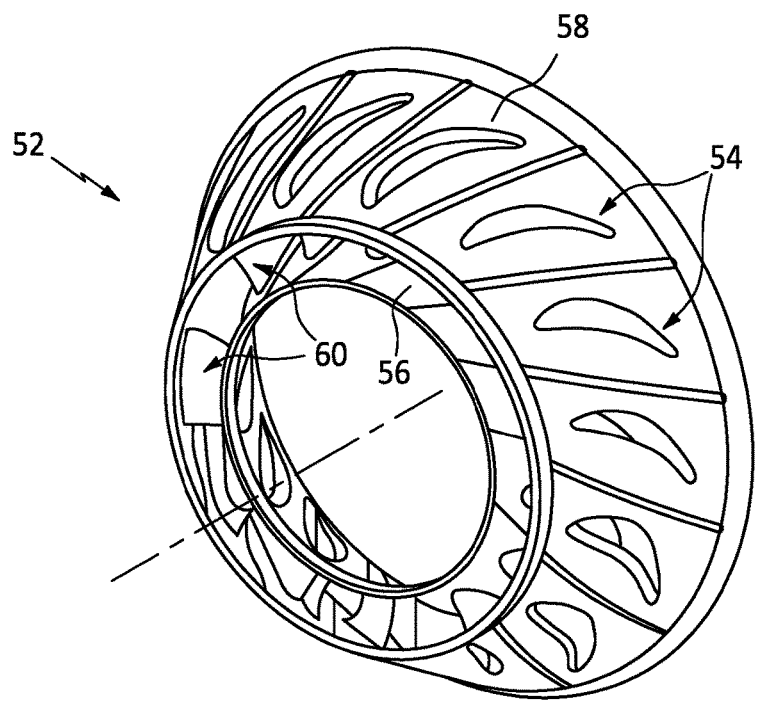
FIG. 2 is a diagrammatic perspective view of a stator vane assembly.

As shown schematically in FIG. 1, the engine 20 also includes a stator vane assembly 52 located axially between the HPT 40 and the LPT 42. The stator vane assembly 52 is connected to a static case such that aerodynamic loads on the stator vane assembly 52 transfer to the static case. FIG. 2 diagrammatically illustrates a stator vane assembly 52 embodiment. The stator vane assembly 52 includes a plurality of distinct vane segments 54. Each of the vane segments 54 includes an inner radial platform 56, an outer radial platform 58, and at least one vane airfoil 60 connected at opposite ends thereof to the inner and outer radial platforms 56, 58. In other examples, there could be more than one airfoil 60 connected to the platforms 56, 58.

During operation, air enters the gas turbine engine 20 through the airflow inlet 24 and is directed through the fan section 28 and into a core gas path or a bypass gas path. The air within the core gas path may be referred to as "core air". The air within the bypass gas path may be referred to as "bypass air". The core air is directed through the engine sections 30, 32, 34 and exits the gas turbine engine 20 through the airflow exhaust 26 to provide forward engine thrust. Within the combustor section 32, fuel is injected into a combustion chamber and mixed with compressed core air. This fuel-core air mixture is ignited to power the gas turbine engine 20. The bypass air is directed through the bypass gas path and out of the gas turbine engine 20 through a bypass nozzle to provide additional forward engine thrust.

Aspects of the present disclosure include an instrumented vane body 62 that can be implemented in a gas turbine engine 20 as a vane within turbine stator vane assembly 52 like that shown in FIG. 2. One or more of the instrumented vane bodies 62 may be disposed within stator vane assembly 52 of a production gas turbine engine or within a gas turbine engine test rig. The present disclosure is not limited to a turbine stator vane application, and may alternatively or additionally be disposed as a stator vane deployed elsewhere in a gas turbine engine; e.g., in the compressor section. The present disclosure is also not limited to any particular stator vane assembly configuration.

Figure 3:
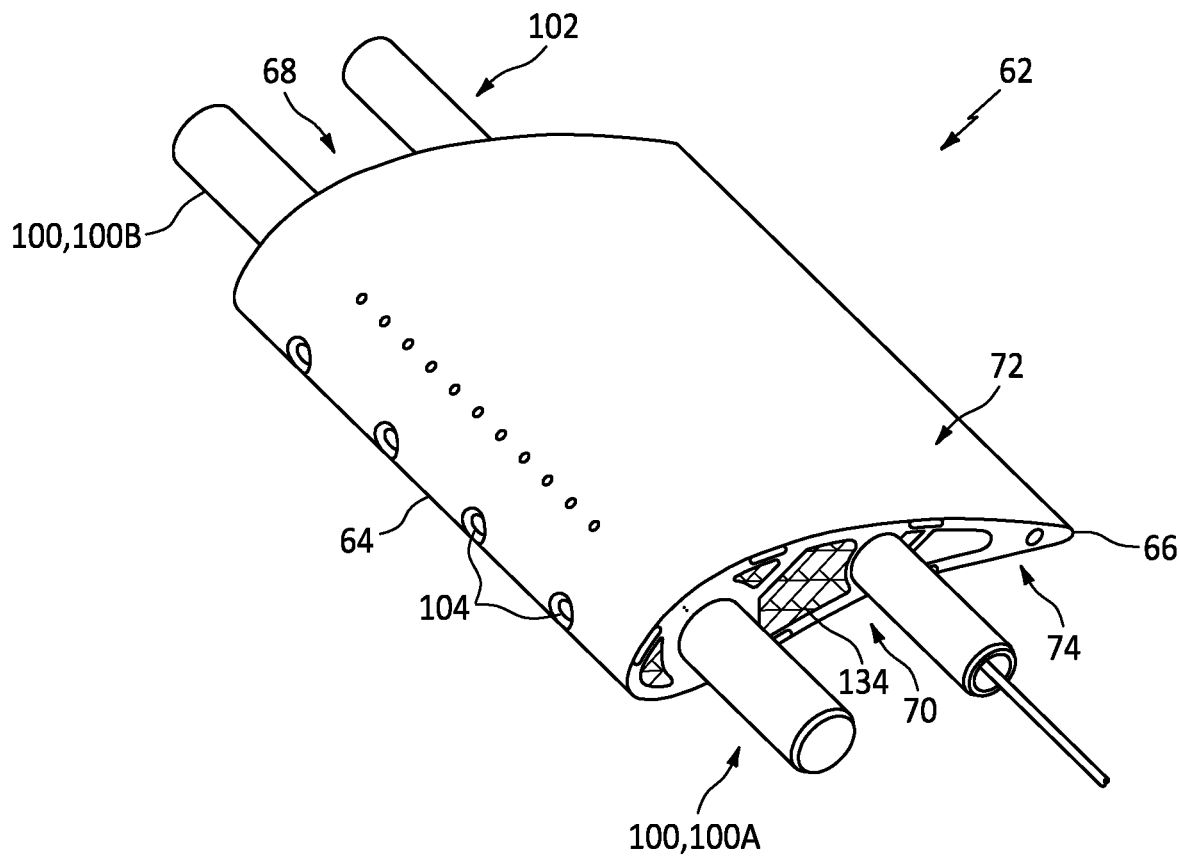
FIG. 3 is a diagrammatic perspective view of a present disclosure instrumented vane body embodiment.
Figure 4:
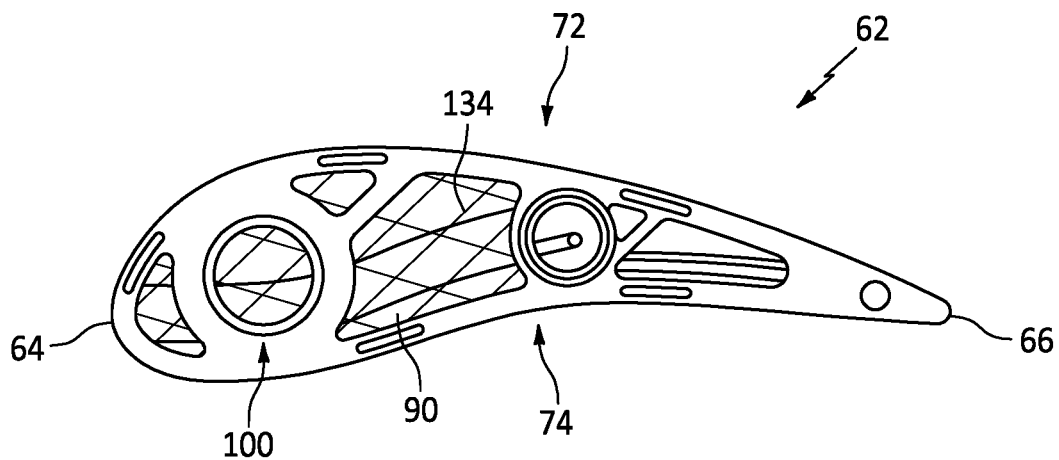
FIG. 4 is an end view of the present disclosure instrumented vane body embodiment shown in FIG. 3.
Figure 5:
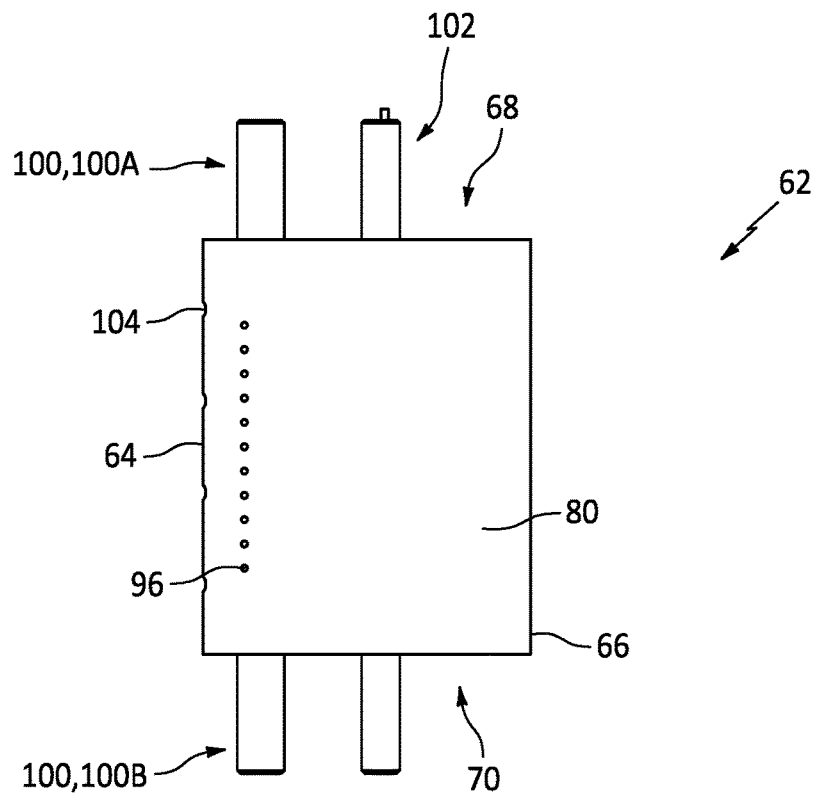
FIG. 5 is a planar pressure side view of the present disclosure instrumented vane body embodiment shown in FIG. 3.
Figure 6:
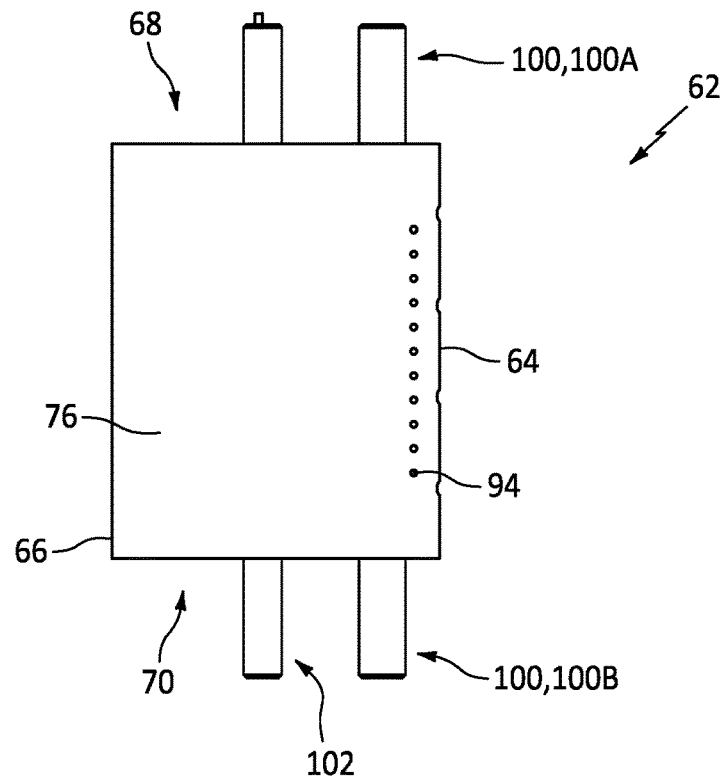
FIG. 6 is a planar suction side view of the present disclosure instrumented vane body embodiment shown in FIG. 3.

Referring to FIG. 3, an instrumented vane body 62 embodiment is diagrammatically shown. The instrumented vane body 62 may have an exterior shape the same as other vane airfoils disposed within a stator vane assembly. The example shown in FIG. 3 has an airfoil configuration with a leading edge 64, a trailing edge 66, an outer radial end 68, and inner radial end 70, a suction side 72, and a pressure side 74. The suction and pressure sides 72, 74 extend chordwise between the leading edge 64 and the trailing edge 66 and the inner and outer radial ends 70, 68. FIG. 4 illustrates a planar end view, FIG. 5 illustrates a planar pressure side view, FIG. 6 illustrates a planar suction side view, FIG. 7 illustrates a planar leading edge view, and FIG. 8 illustrates a planar trailing edge view of the instrumented vane body 62 embodiment shown in FIG. 3.

Referring to FIG. 9, in some embodiments the instrumented vane body 62 has a double wall configuration with a suction side outer wall 76, a suction side inner wall 78, a pressure side outer wall 80, and a pressure side inner wall 82. The suction side inner and outer walls 78, 76 are spaced apart from one another creating a suction side passage 84 therebetween. A plurality of support members 86 (e.g., cylindrical pins) extend within the suction side passage 84 between and are attached to the facing surfaces of the suction side inner and outer walls 78, 76. In similar fashion, the pressure side inner and outer walls 82, 80 are spaced apart from one another creating a pressure side passage 88 therebetween, and a plurality of support members 86 (e.g., cylindrical pins) extend within the pressure side passage 88 between and are attached to the facing surfaces of the pressure side inner and outer walls 82, 80. The suction side and pressure side inner walls 78, 82 define an interior cavity 90. In some embodiments, the suction side and pressure side passages 84, 88 may be in communication with one another at the leading edge 64 of the vane body 62. Both the suction side and pressure side passages 84, 88 are in fluid communication with vent apertures 92 (e.g., holes or slots) disposed at the trailing edge 66 to permit the escape of cooling air as will be described herein.

In some embodiments, the suction side outer wall 76 and/or the pressure side outer wall 80 may include apertures 94, 96 extending therethrough that permit cooling air to escape the respective suction side passage 84 or pressure side passage 88 to the exterior of the vane. FIGS. 6 and 7 illustrate a row of apertures 94 disposed in the suction side outer wall 76 proximate the leading edge 64. FIG. 5 illustrates a row of apertures 96 disposed in the pressure side outer wall 80 proximate the leading edge 64. The present disclosure does not require cooling air apertures disposed in the suction side outer wall 76 or the pressure side outer wall 80. In those embodiments that do include cooling air apertures disposed in the suction side outer wall 76 or the pressure side outer wall 80, the instrumented vane body 62 may include any configuration of cooling air apertures and is not limited to the single rows of cooling air apertures shown in FIGS. 5-7; e.g., additional cooling air aperture rows may be included, cooling air apertures may be included proximate the trailing edge 66, and the like.

The present disclosure is not limited any particular outer wall cooling air aperture configuration. For example, the outer wall cooling air apertures 94, 96 may have a constant geometry disposed substantially perpendicular to the inner and outer surfaces of the respective outer wall 76, 80 such that cooling air exits in a direction substantially perpendicular to the outer surface of the outer wall 76, 80. Alternatively, the cooling air apertures 94, 96 may be disposed at an angle relative the inner and outer surfaces of the respective outer wall 76, 80 so that the cooling air exits in a direction more generally toward the trailing edge 66 (i.e., at an acute angle relative to the outer surface of the outer wall). Furthermore, the cooling air apertures may have a geometry that "expands" (e.g., greater cross-sectional area) from the inner surface to the outer surface of the respective outer wall 76, 80. A cooling aperture configuration that expands at the outer surface of the outer wall 76, 80 may have the effect of decreasing the velocity of the exiting cooling air and facilitating the creation of film cooling/protective cooling air barrier at the outer surface of the outer wall 76, 80.

Figure 10:
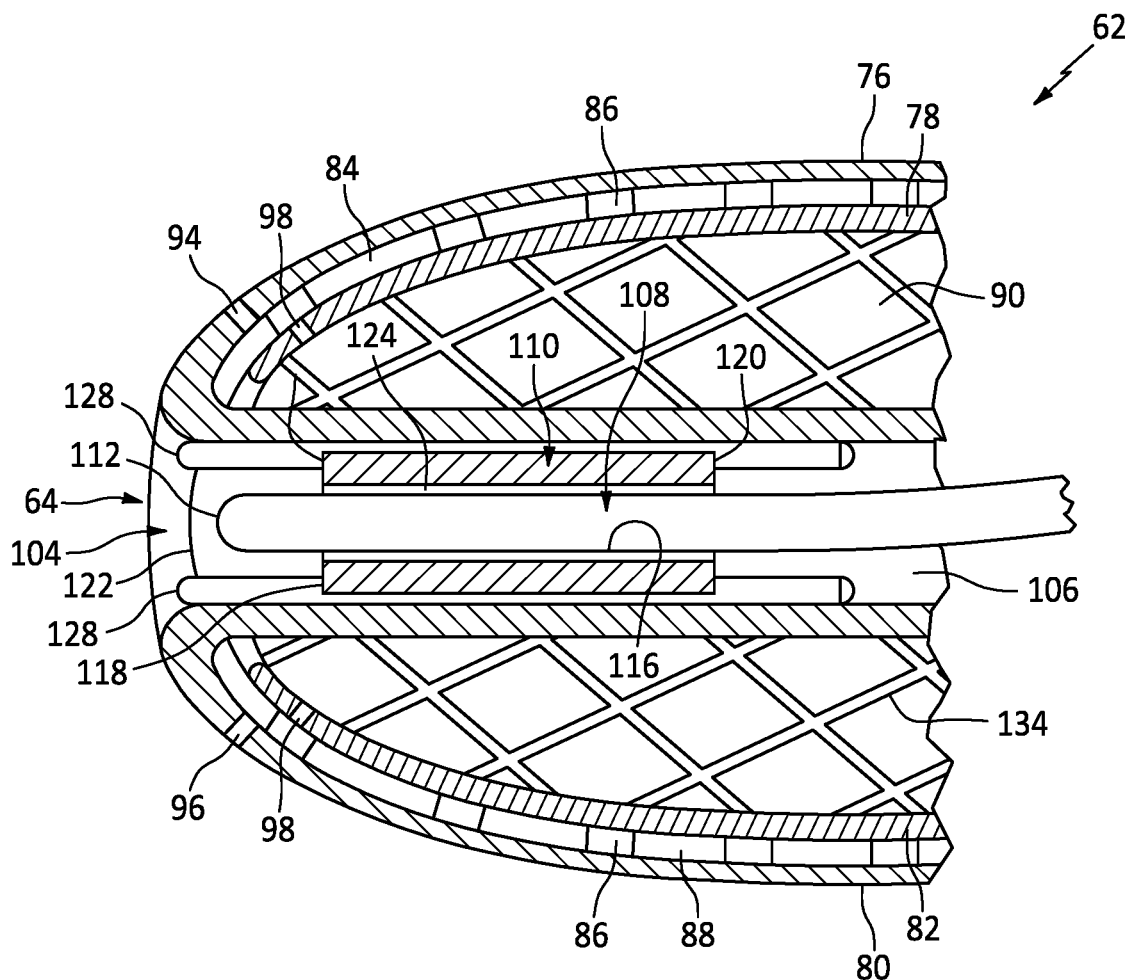
FIG. 10 is a diagrammatic sectioned view of a present disclosure instrumented vane body embodiment.

In some embodiments, the suction side inner wall 78 and/or the pressure side inner wall 82 may include apertures 98 extending therethrough that permit cooling air to pass from the interior cavity 90 and into the respective suction side passage 84 or pressure side passage 88. FIG. 10 illustrates cooling air apertures 98 disposed in both the suction side and pressure side inner walls 78, 82 proximate the leading edge 64. Both the suction side and the pressure side inner walls 78, 82 may include a plurality of these cooling air apertures 98 spaced apart from one another along the leading edge 64 between the inner and outer radial ends 70, 68. Some embodiments may only include a row of these inner wall cooling air apertures 98 disposed adjacent the leading edge 64 between the inner and outer radial ends 70, 68. Other embodiments may include additional cooling air apertures 98 disposed elsewhere in the suction side inner wall 78, or elsewhere in the pressure side inner wall 82, or both.

In some embodiments, the instrumented vane body 62 includes at least one cooling air supply conduit 100 (e.g., a tube) disposed aft of the leading edge 64. The supply conduit 100 provides a passage for cooling air to enter into the interior cavity 90 of the instrumented vane body 62. FIGS. 3, 5-8, and 12A illustrate an embodiment having an outer supply conduit 100A extending into the interior cavity 90 from the outer radial end 68 and an inner supply conduit 100B extending into the interior cavity 90 from the inner radial end 70. In alternative embodiments, the instrumented vane body 62 may include only an inner supply conduit 100B or only an outer supply conduit 100A.

In some embodiments, the instrumented vane body 62 includes at least one cooling air egress conduit 102 (e.g., a tube) disposed aft of the supply conduit 100. The egress conduit 102 extends within the vane body 62 between the inner and outer radial ends 70, 68. FIGS. 3, 5-8, and 12A illustrate an embodiment having an egress conduit 102 that extends out from the outer radial end 68 and out from the inner radial end 70. In alternative embodiments, the egress conduit 102 disposed within the vane body 62 may extend out from the vane body 62 at only the inner radial end 70 or the outer radial end 68. In some embodiments, the portion of the egress conduit 102 disposed outside of the vane body 62 (e.g., at the inner radial end 70 or the outer radial end 68, or both) may be sealed (e.g., airtight) to prevent the passage of core gas out of the portion of the egress conduit 102 disposed outside of the vane body 62; i.e., at the inner radial end 70, the outer radial end 68, or both.

Figures 12, 12A:
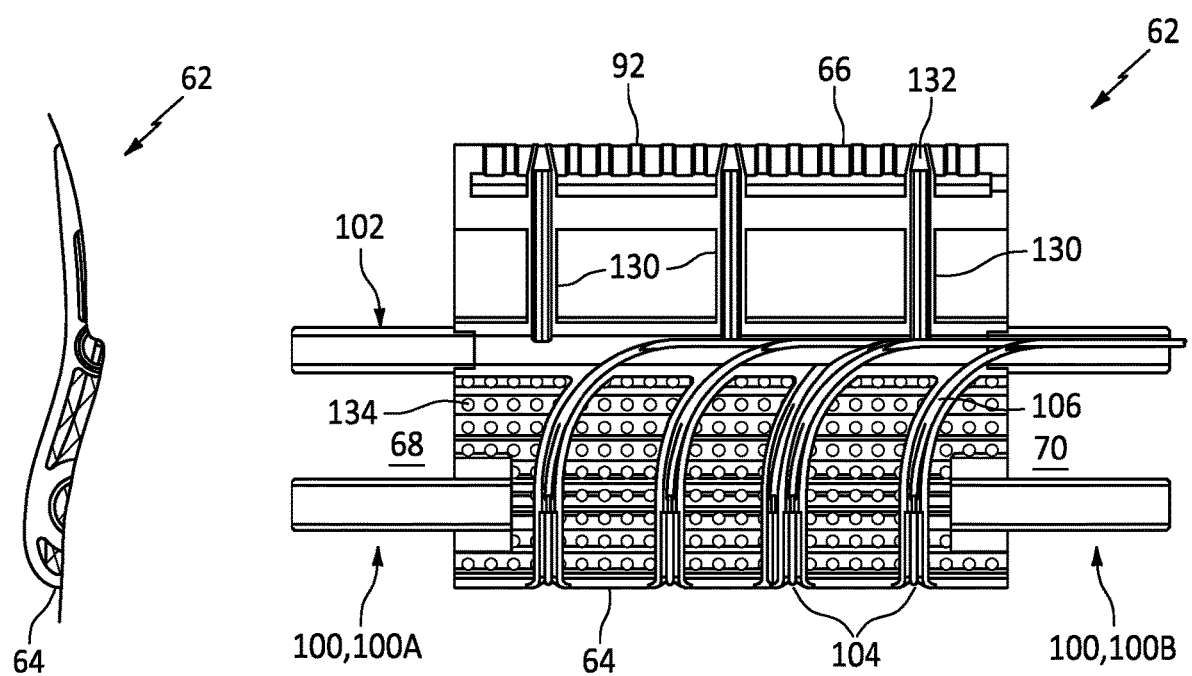
FIG. 12 is a diagrammatic sectioned end view of a present disclosure instrumented vane body embodiment.
FIG. 12A is a side view of the sectioned view shown in FIG. 12.

The instrumented vane body 62 includes a plurality of sensor ports 104 disposed at the leading edge 64 of the instrumented vane body 62 each configured to receive a sensor assembly. The sensor ports 104 are spaced apart from one another between the inner and outer radial ends 70, 68 of the vane body 62. The embodiment shown in FIG. 3 includes four (4) sensor ports 104. The number of sensor ports 104/sensors disposed at the leading edge 64 may vary depending on the application and the present disclosure is therefore not limited to any particular number of sensor ports 104/sensors. In some embodiments, the sensor ports 104 are aligned with one another along the leading edge 64; e.g., all sensor ports 104 dissecting a line parallel with the leading edge 64. In some embodiments, the sensor ports 104 may be aligned with the stagnation point of the leading edge 64. Each sensor port 104 is an aperture disposed within the vane body 62 and therefore does not extend outwardly from the leading edge 64 of the vane body 62. This configuration mitigates or avoids core gas flow interruption that may occur with a structure that extends outwardly from the leading edge 64. The sensor port 104 has an inner diameter, is open to the leading edge 64, and extends inwardly, generally perpendicular to the outer surface of the vane at the leading edge 64. As shown in FIG. 12A, each sensor port 104 may be in communication the egress conduit 102 via a respective passage 106 that extends between the respective sensor port 104 and the egress conduit 102. The sensor itself (e.g., a thermocouple), or signal wire(s) attached to a sensor, may extend through the aligned passage 106 and thereafter into the egress conduit 102 and thereafter out of the vane body 62 for connection with instrumentation hardware.

Figure 10A:
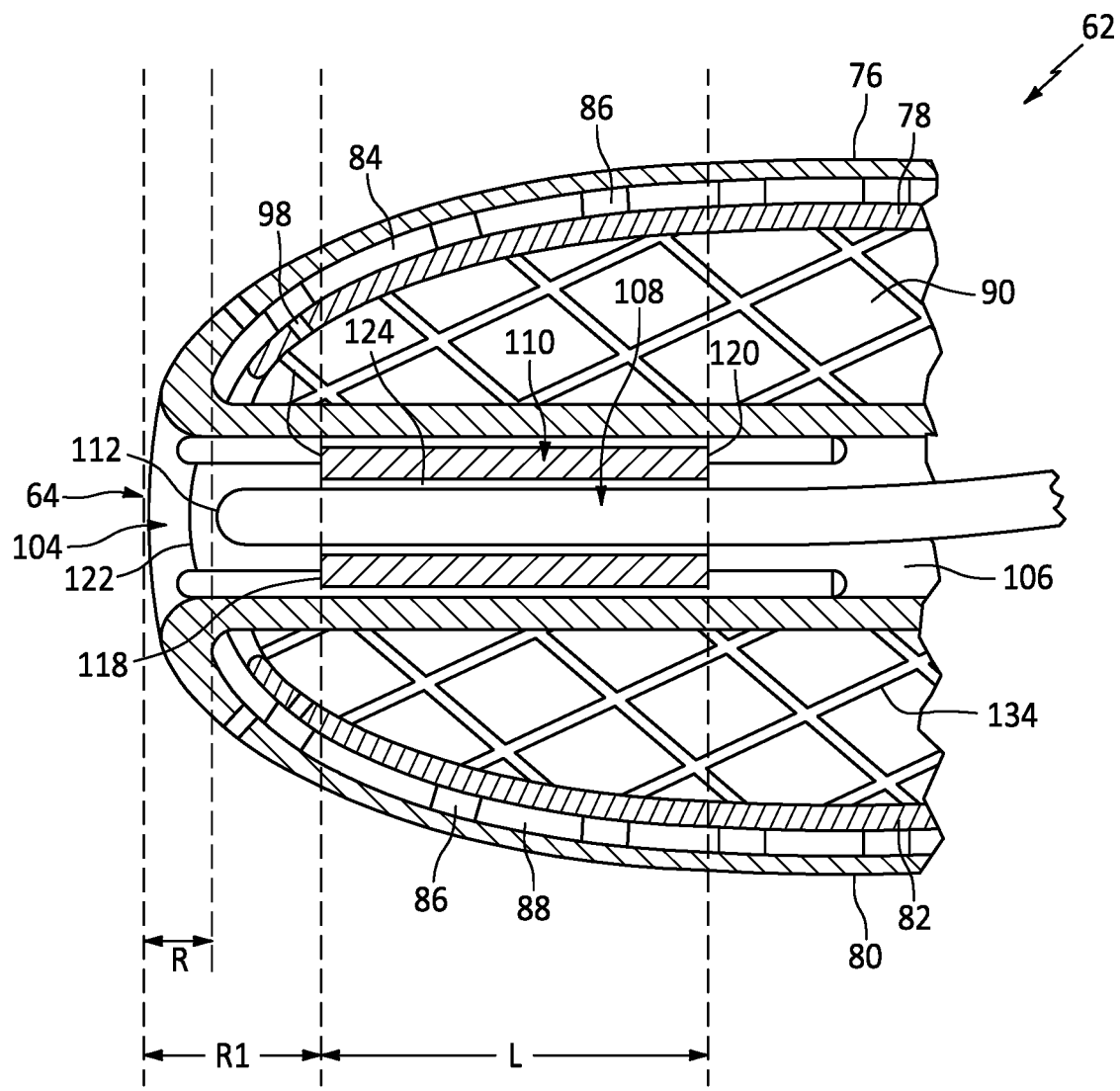
FIG. 10A is a diagrammatic sectioned view of a present disclosure instrumented vane body embodiment.

FIGS. 10 and 10A illustrate an example sensor port 104 configuration with a sensor 108 in the form of a sheathed Kiel temperature probe (e.g., a sheathed thermocouple) and a spacing cylinder 110 disposed within a sensor port 104. The sheathed thermocouple 108 includes a forward end 112. As indicated above, the sensor 108 itself or signal wires connected to the sensor extend away from the thermocouple 108, through the aligned passage 106 and into the egress conduit 102 and thereafter out of the vane body 62 for connection with instrumentation hardware. The spacing cylinder 110 includes a center bore 116 with an inner diameter, an outer diameter, a forward end 118, an aft end 120, and a length ("L") extending between the forward and aft ends 118, 120. A portion of the sheathed thermocouple 108 extends through the center bore 116 of the spacing cylinder 110. The forward end 112 of the sheathed thermocouple 108 may be disposed at a recessed distance ("R") inwardly from the open end 122 of the sensor port 104. The forward end 118 of the spacing cylinder 110 may be disposed at a recessed distance ("R1") inwardly from the open end 122 of the sensor port 114. The spacing cylinder 110 bore inner diameter is larger than the sheathed thermocouple 108 outer diameter to permit airflow through an annular region 124 disposed therebetween. The length ("L") of the spacing cylinder 110 is preferably long enough to support and axially orient the sheathed thermocouple 108. The spacing cylinder 110 may comprise a high temperature resistant material such as alumina, tungsten, and the like. In some embodiments, the spacing cylinder 110 may be configured to permit core gas to become entrained within spacing cylinder 110 and/or to pass between the inner and outer diameters of the spacing cylinder 110; e.g., the spacing cylinder 110 may have perforations or be porous. Nonlimiting examples of acceptable sheathed thermocouples for gas turbine applications include Type-R, Type-S, and Type-B thermocouples.

Figure 11:
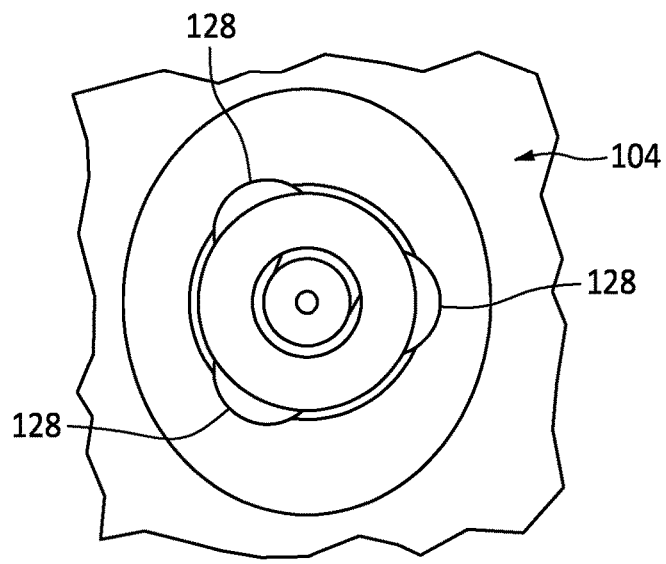
FIG. 11 is a diagrammatic planar view of a sensing port embodiment as seen from the leading edge.

Referring to FIG. 11, in some embodiments, a sensor port 104 may include a plurality of vent passages 128 disposed around the periphery of the sensor port 104. Each vent passage 128 breaks through the inner diameter surface of the sensor port 104, extending from the open end 122 of the sensor port 104 to a depth inward of the spacing cylinder 110. Each vent passage 128 thereby provides a gas passage outside of the outer diameter of the spacing cylinder 110. The vent passages 128 and the annular region 124 between the sheathed thermocouple 108 outer diameter and the spacing cylinder 110 inner diameter permits high temperature core gas to contact the inner and outer diameter surfaces of the spacing cylinder 110 to establish thermal uniformity along the length of the spacing cylinder 110. The vent passages 128 and the annular region 124 between the sheathed thermocouple 108 outer diameter and the spacing cylinder 110 inner diameter also facilitate a pressure difference across the sensor port 104.

As stated above, the present disclosure is not limited to using thermocouples for sensing the core gas flow, and also not limited to using Kiel probes. Alternative sensors 108 include, but are not limited to, pressure sensors (e.g., a pressure tap that includes a small diameter tube in communication with a pressure gauge from which total pressure may be measured, or a small tube configured to collect core gas specimens from which species within the core gas can be identified and/or measured, one or two platinum wire cables passed through a double hole alumina support cylinder, from which a two, three, or four wire resistance temperature detector (RTD) junction can be located within a Kiel probe head.

Referring to FIGS. 9 and 12A, in some embodiments the instrumented vane body 62 may include a plurality of trailing edge vents 130 extending between the egress conduit 102 and the trailing edge 66 to permit the passage of high temperature core gas within the egress conduit 102 to pass through the trailing vents 130 and exit the vane body 62. Referring to FIG. 12A, in some embodiments one or more of the trailing edge vents 130 may be configured to produce a back pressure in core gas exiting through the trailing edge vent 130; e.g., the trailing edge vent may include a region 132 disposed proximate the trailing edge 66 where the cross-sectional area of the trailing edge vent 130 decreases.

Referring to FIG. 4, in some embodiments the instrumented vane body 62 may include structural elements 134 that extend within the interior cavity 90 (e.g., from the suction side inner wall to the pressure side inner wall) to increase the structural integrity of the vane body 62. The structural elements 134 are configured to freely permit the flow of cooling air within the interior cavity 90.

The present disclosure instrumented vane body 62 may be formed using a variety of different methods. A nonlimiting example of a manufacturing method that may be used to form the instrumented vane body 62 is additive manufacturing. The complexity of the various features and tortuous path of the cooling and venting passageways within the vane body 62 make additive manufacturing an attractive, low cost, but not required, manufacturing methodology. Using an additive manufacturing process, the vane body 62 may be manufactured with a high temperature alloys like Inconel 625, Inconel 718, Hastelloy, and the like, and can be heat treated to attain near wrought metal properties with similar heat treatment. Nonlimiting alternative manufacturing process that may be used include casting processes (e.g., lost casting) or conventional machining and welding.

As stated above, one or more instrumented vane bodies 62 may be installed in a stator vane assembly 52 (e.g., a turbine stator vane assembly) of a production gas turbine engine or a gas turbine engine test rig. Once installed, the instrumented vane body 62 is disposed in the same manner as any other stator vane in the assembly 52.

During operation of the gas turbine engine 20, core gas is drawn the through the core gas path of the engine 20 and is incident to the instrumented stator vane body 62. Cooling air (e.g., pressurized cooling air bled from a compressor section 30) is routed into the interior cavity 90 of the instrumented vane body 62 via the supply conduit 100. The cooling air now disposed within the interior cavity 90 passes through the inner wall cooling apertures 98 and enters the suction side passage 84 and the pressure side passage 88. The inner wall cooling apertures 98 may be configured to produce impingement cooling of the respective outer wall 76, 80; e.g., proximate the leading edge 64. As stated above, the suction side and pressure side passages 84, 88 are in fluid communication with vent apertures 92 disposed at the trailing edge 66 to permit the egress of cooling air from the vane body 62. A difference in pressure provides the motive force to drive the cooling air through the suction side and pressure side passages 84, 88 and out the vent apertures 92 disposed at the trailing edge 66. During the passage through the suction side and pressure side passages 84, 88 the cooling air encounters the support members 86 (e.g., pins) extending between the respective inner and outer walls that define the passages 84, 88. The support members 86 provide heat transfer surfaces to remove thermal energy from the outer wall 76, 80 to the cooling air passing through the suction side and pressure side passages 84, 88. In those embodiments that include cooling apertures 94, 96 extending through the outer walls 76, 80, cooling air disposed in the suction side and pressure side passages 84, 88 will pass through the outer wall cooling apertures 94, 96 and provide additional cooling of the outer walls 76, 80.

During operation of the gas turbine engine 20, the high temperature core gas incident to the leading edge 64 of the instrumented vane body 62 will encounter the sensor ports 104/sensors 108. High temperature core gas encountering a respective sensor port 104/sensor 108 will enter the sensor port 104 and encounter the forward end 118 of the spacing cylinder 110. In those embodiments that include a sheathed thermocouple 108 recessed slightly (distance "R") from the open end 122 of the sensor port 104 (e.g., as shown in FIG. 10), it is understood that core gas encountering the forward end 118 of the spacing cylinder 110 will become near stagnant, and will subsequently pass through the annular region 124 between the outer diameter of the sheathed thermocouple 108 and the inner diameter of the spacing cylinder center bore 116. Core gas passing through the annular region 124 between the sheathed thermocouple 108 and the spacing cylinder center bore 116 will subsequently pass into the passage 106 connecting the sensor port 104 and the egress conduit 102. In those embodiments including sensor port vent passages 128 disposed radially outside of the spacing cylinder 110, core gas passing therethrough will also subsequently pass into the passage 106 connecting the sensor port 104 and the egress conduit 102. Regardless of whether the core gas passing through the sensor port 104 includes only that passing through the annular region 124 between the sheathed thermocouple 108 and the spacing cylinder center bore 116, or whether it also includes core gas passing through the sensor port vent passages 128, the core gas traveling therethrough will increase the uniformity of the thermal environment sensed by the sheathed thermocouple 108 along the length of the thermocouple 108, mitigate temperature differences between the forward and aft ends of the thermocouple 108, facilitate maintaining a pressure difference across the sensor port 104, and provide a temperature reading at or near the total temperature of the high temperature core gas.

In the embodiment shown in FIG. 12A, the high temperature core gas passing into the egress conduit 102 from the passages 106 connected to the sensor ports 104 may exit the instrumented vane body 62 through the trailing edge vents 130 extending between the egress conduit 102 and the trailing edge 66. As indicated herein, the trailing edge vents 130 may be configured in some embodiments to produce a back pressure to provide desirable core gas flow characteristics; e.g., to prevent sonic flow therethrough. The motive force required to move the core gas through the sensor ports 104, passages 106, egress conduit 102 and out the trailing edge vents 130 is understood to be provided by the pressure profile created by the core gas flow external to the vane body 62 between the leading and trailing edges 64,66; e.g., the pressure of the core gas flow at the leading edge 64 is understood to higher than the pressure of the core gas flow at the trailing edge 66.

The present disclosure instrumented vane body 62 is understood to provide a distinct improvement over current instrumenting approaches. For example, the present disclosure instrumented vane body 62 provides a structurally sound sensing body capable of withstanding high temperature core gas flow that can support multiple sensors. As another example, nature of the present disclosure instrumented vane body 62 disposed within a stator vane assembly 52 eliminates the need to place an additional structure in the core gas path and thereby reduces or eliminates flow disturbances associated with sensing devices that could affect measurement.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An instrumented vane body, comprising:
a suction side outer wall and a suction side inner wall, both extending chordwise between a leading edge and a trailing edge and between an inner radial end and an outer radial end, the suction side outer wall and the suction side inner wall spaced apart from one another forming a suction side passage therebetween;

a pressure side outer wall and a pressure side inner wall, both extending chordwise between the leading edge and the trailing edge and between the inner radial end and the outer radial end, the pressure side outer wall and the pressure side inner wall spaced apart from one another forming a pressure side passage therebetween;

wherein the suction side inner wall and the pressure side inner wall define an interior cavity;

at least one supply conduit in fluid communication with the interior cavity through at least one of the inner radial end or the outer radial end;

wherein the suction side inner wall is configured to permit passage of cooling air from the interior cavity into the suction side passage, and the pressure side inner wall is configured to permit passage of cooling air from the interior cavity into the pressure side passage;

wherein the suction side passage and the pressure side passage are in fluid communication with an exterior of the vane body;

a plurality of sensor ports disposed in the leading edge, spaced apart from one another between the inner radial end and the outer radial end;

a plurality of sensors, each said sensor disposed within a respective said sensor port;

an egress conduit extending within the interior cavity and out of the vane body at the inner radial end or the outer radial end, or both, the egress conduit in fluid communication with the sensor ports; and a plurality of trailing edge vents extending between the egress conduit and the exterior of the vane body proximate the trailing edge, the plurality of trailing edge vents configured to provide fluid communication between the egress conduit and the exterior of the vane body.

2. The instrumented vane body of claim 1, wherein each said sensor port has an open end disposed in the leading edge.

3. The instrumented vane body of claim 2, wherein each said sensor has a forward end, and the forward end of each said sensor is recessed within the respective sensor port.

4. The instrumented vane body of claim 3, wherein each said sensor is a thermocouple.

5. The instrumented vane body of claim 2 further comprising a plurality of passages, each respective said passage extending between a respective said sensor port and the egress conduit and providing fluid communication therebetween.

6. The instrumented vane body of claim 1, further comprising a plurality of first support members extending between the suction side outer wall and the suction side inner wall, and a plurality of second support members extending between the pressure side outer wall and the pressure side inner wall.

7. The instrumented vane body of claim 6, wherein the suction side inner wall includes a plurality of suction side inner wall apertures extending through the suction side inner wall, and the pressure side inner wall includes a plurality of pressure side inner wall apertures extending through the pressure side inner wall.

8. The instrumented vane body of claim 6, wherein the suction side outer wall includes a plurality of suction side outer wall apertures extending through the suction side outer wall, or the pressure side outer wall includes a plurality of pressure side outer wall apertures extending through the pressure side outer wall, or both.

9. The instrumented vane body of claim 1, wherein the egress conduit is sealed airtight to prevent core gas passage out of the egress conduit at the inner radial end, the outer radial end, or both.

10. An instrumented vane body, comprising:
a suction side outer wall and a pressure side outer wall, both extending chordwise between a leading edge and a trailing edge and between an inner radial end and an outer radial end;
an interior cavity;
at least one supply conduit in fluid communication with the interior cavity, the at least one supply conduit in communication with the interior cavity through at least one of the inner radial end or the outer radial end;
a plurality of sensors;
a plurality of sensor ports disposed in the leading edge, each respective said sensor port configured to receive a respective said sensor of the plurality of sensors, the plurality of sensor ports spaced apart from one another between the inner radial end and the outer radial end, and each said sensor port in fluid communication with at least one vent aperture disposed proximate the trailing edge, each said sensor port configured to permit core gas to enter that respective said sensor part port and exit the vane body through the at least one vent aperture.

11. The instrumented vane body of claim 10, wherein each said sensor port has an open end disposed in the leading edge.

12. The instrumented vane body of claim 11, wherein each said sensor is a thermocouple having a forward end, and each respective said thermocouple is disposed within a respective said sensor port, and the forward end of each respective said thermocouple is recessed within the respective said sensor port a first distance.

13. The instrumented vane body of claim 12, wherein each said sensor port is an aperture extending into the vane body substantially perpendicular to the leading edge, each said sensor port having an open end disposed in the leading edge and a sensor port inner diameter surface; and
the instrumented vane body further comprising a plurality spacing cylinders, each respective said spacing cylinder disposed in a respective said sensor port and each spacing cylinder having a length that extends between a forward end and an aft end, and a center bore that extends lengthwise between the forward end and the aft end and has a center bore inner diameter surface;
wherein a portion of each respective said sensor is disposed within the center bore of a respective said spacing cylinder.

14. The instrumented vane body of claim 13, wherein the forward end of each said spacing cylinder is recessed within the respective said sensor port a second distance, wherein the second distance is greater than the first distance.

15. The instrumented vane body of claim 14, wherein the center bore of each respective said spacing cylinder and the sensor disposed within that said center bore are configured such that an annular region is disposed between the center bore inner diameter surface and the respective said sensor to permit gas passage through the annular region.

16. The instrumented vane body of claim 15, further comprising:
an egress conduit extending within the interior cavity and out of the vane body at the inner radial end or the outer radial end, or both; and a plurality of passages, each respective said passage extending between a respective said sensor port and the egress conduit and providing fluid communication therebetween;

wherein the egress conduit is in fluid communication with the at least one vent aperture disposed proximate the trailing edge.

17. The instrumented vane body of claim 13, further comprising a plurality of sensor port vent passages disposed around the periphery of each respective said sensor port, wherein each said vent passage breaks through the sensor port inner diameter surface of the respective said sensor port and extends into the vane body beyond the aft end of the spacing cylinder disposed in the respective said sensor port.

18. The instrumented vane body of claim 10, further comprising a suction side inner wall extending chordwise between the leading edge and the trailing edge and between the inner radial end and the outer radial end, and spaced apart from the suction side outer wall to form a suction side passage therebetween; and a pressure side inner wall extending chordwise between the leading edge and the trailing edge and between the inner radial end and the outer radial end, and spaced apart from the pressure side outer wall to form a pressure side passage therebetween; and wherein the suction side passage and the pressure side passage are in fluid communication with the interior cavity; and wherein the suction side passage and the pressure side passage are in fluid communication with an exterior of the vane body.

19. The instrumented vane body of claim 18, further comprising a plurality of first support members extending between the suction side outer wall and the suction side inner wall, and a plurality of second support members extending between the pressure side outer wall and the pressure side inner wall.

20. A stator vane assembly, comprising:
a plurality of stator vanes including at least one instrumented vane body that includes:
a suction side outer wall and a pressure side outer wall, both extending chordwise between a leading edge and a trailing edge and between an inner radial end and an outer radial end;
an interior cavity;
at least one supply conduit in fluid communication with the interior cavity through at least one of the inner radial end or the outer radial end;
a plurality of sensors; and
a plurality of sensor ports disposed in the leading edge, each respective sensor port configured to receive a respective sensor of the plurality of sensors, the plurality of sensor ports spaced apart from one another between the inner radial end and the outer radial end, and each sensor port in fluid communication with at least one vent aperture disposed proximate the trailing edge, each sensor port configured to permit core gas to enter that respective sensor part port and exit the vane body through the at least one vent aperture.

* * * * *